US012101492B2

(12) United States Patent
Chen et al.

(10) Patent No.: US 12,101,492 B2
(45) Date of Patent: Sep. 24, 2024

(54) UNPROCESSED IMAGE CODING AND DECODING

(71) Applicant: Black Sesame International Holding Limited, San Jose, CA (US)

(72) Inventors: Bin Chen, San Jose, CA (US); Donghui Wu, San Mateo, CA (US)

(73) Assignee: Black Sesame Technologies Inc.

( * ) Notice: Subject to any disclaimer, the term of this patent is extended or adjusted under 35 U.S.C. 154(b) by 454 days.

(21) Appl. No.: 17/355,842

(22) Filed: Jun. 23, 2021

(65) Prior Publication Data

US 2022/0417537 A1   Dec. 29, 2022

(51) Int. Cl.
| H04N 19/186 | (2014.01) |
| H04N 19/119 | (2014.01) |
| H04N 19/124 | (2014.01) |
| H04N 19/176 | (2014.01) |
| H04N 19/18 | (2014.01) |
| H04N 19/625 | (2014.01) |
| H04N 19/63 | (2014.01) |
| H04N 19/64 | (2014.01) |
| H04N 19/91 | (2014.01) |

(52) U.S. Cl.
CPC ......... *H04N 19/186* (2014.11); *H04N 19/119* (2014.11); *H04N 19/124* (2014.11); *H04N 19/176* (2014.11); *H04N 19/18* (2014.11); *H04N 19/625* (2014.11); *H04N 19/63* (2014.11); *H04N 19/64* (2014.11); *H04N 19/91* (2014.11)

(58) Field of Classification Search
CPC .................................................... H04N 19/186
USPC .................................................... 375/240.03
See application file for complete search history.

(56) References Cited

U.S. PATENT DOCUMENTS

| 10,609,398 B2 | 3/2020 | Gu et al. | |
| 2007/0233764 A1* | 10/2007 | Reznik | G06F 17/147 |
| | | | 708/402 |
| 2009/0226103 A1* | 9/2009 | Choi | H04N 19/61 |
| | | | 382/233 |
| 2011/0150330 A1* | 6/2011 | Jannard | H04N 19/46 |
| | | | 382/166 |
| 2012/0106631 A1* | 5/2012 | Kim | H04N 19/61 |
| | | | 375/240.03 |
| 2019/0313098 A1* | 10/2019 | Grois | H04N 19/60 |
| 2022/0014773 A1* | 1/2022 | Ustarroz-Calonge | |
| | | | H04N 19/85 |
| 2023/0141888 A1* | 5/2023 | Alakuijala | H04N 19/154 |
| | | | 375/240.02 |

\* cited by examiner

*Primary Examiner* — Yulin Sun
(74) *Attorney, Agent, or Firm* — Timothy T. Wang; Ni, Wang & Massand, PLLC (57) ABSTRACT

A method of image compression, including, receiving at least one unprocessed image frame, transforming a domain of the at least one unprocessed image frame to output a transformed domain dataset, block processing the transformed domain dataset to yield a blocked dataset, quantizing the blocked dataset to produce a quantized dataset and entropy encoding the quantized dataset to construct at least one compressed image frame.

18 Claims, 5 Drawing Sheets

UNPROCESSED IMAGE CODING AND DECODING

BACKGROUND

Technical Field

The instant disclosure is related to image compression and decompression more specifically to unprocessed image coding and decoding.

Background

Currently, unprocessed image frame data compression and decompression are performed on 8-bit data. There is currently no applicable way to compress and decompress high-bit unprocessed image frame data with high fidelity especially for multiple frames.

SUMMARY

An example method of image compression, including, receiving at least one unprocessed image frame, transforming a domain of the at least one unprocessed image frame to output a transformed domain dataset, block processing the transformed domain dataset to yield a blocked dataset, quantizing the blocked dataset to produce a quantized dataset and entropy encoding the quantized dataset to construct at least one compressed image frame.

Another example method of image decompression, including, receiving at least one compressed image frame, entropy decoding the at least one compressed image frame to construct an entropy decoded dataset, de-quantizing the entropy decoded dataset to produce a de-quantized dataset, inverse block processing the de-quantized dataset to yield produce an inverse blocked dataset and inverse transforming the inverse blocked dataset to output at least one unprocessed image frame.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
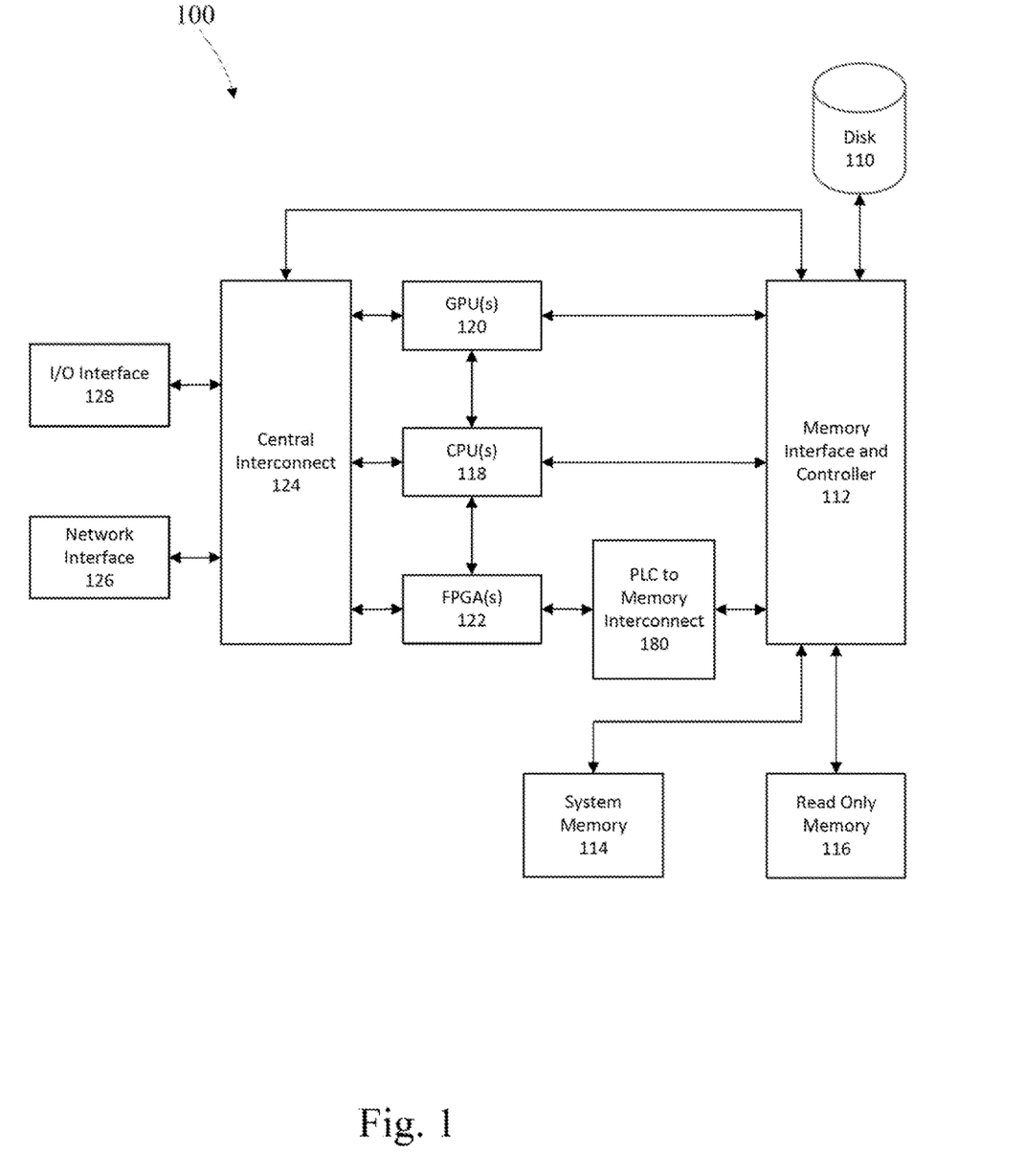
FIG. 1 is a first example system diagram in accordance with one embodiment of the disclosure.

FIG. 1 depicts an example hybrid computational system 100 that may be used to implement coding and decoding associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing coding and decoding. A CPU is a general processor that may perform many different functions, its generality leads to the ability to perform multiple different tasks, however, its processing of multiple streams of data is limited and its function with respect to coding and decoding is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller are connected to a central interconnect 124, the central interconnect is additionally connected to the GPU 120, CPU 118 and FPGA 122. The central interconnect 124 is additionally connected to the input and output interface 128 and the network interface 126.

Figure 2:
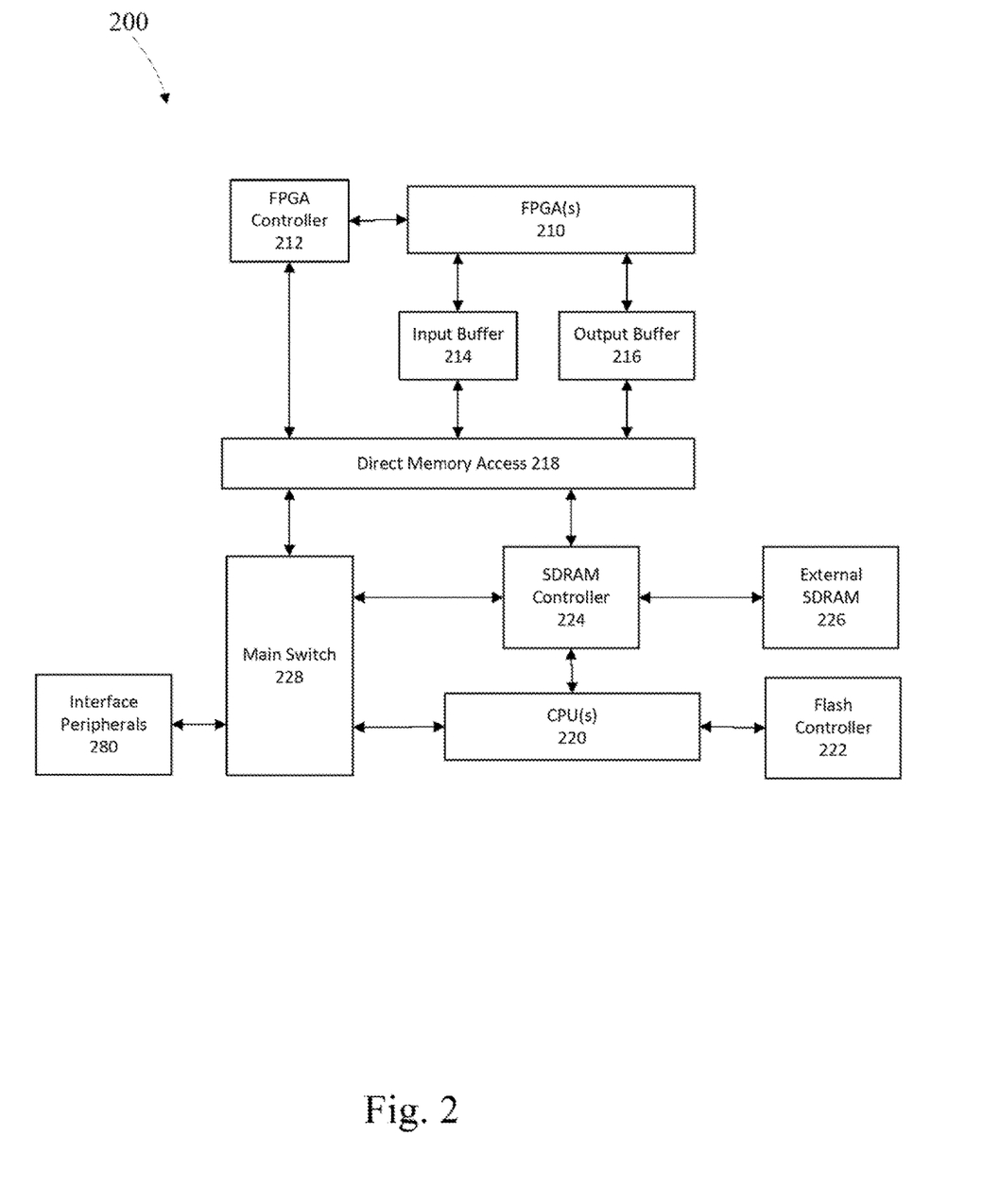
FIG. 2 is a second example system diagram in accordance with one embodiment of the disclosure.

FIG. 2 depicts a second example hybrid computational system 200 that may be used to implement coding and decoding associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 221 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

An image sensor outputs a raw image dataset that includes at least one unprocessed image frame. The unprocessed image frame may be completely unprocessed or minimally processed and provides the input of an image signal processor (ISP). The unprocessed image frame tends to have a large data size due to a high per pixel bit depth as compared with a processed color image. If the unprocessed image frame takes the form of multiple image frames to be processed concurrently through an image signal processor, these unprocessed image frames may be transferred for storage in off-chip memory due to limited on-chip memory size. Consequently, the memory bandwidth for transferring multiple unprocessed image frames may be prohibitive. One potential problem is that compression of unprocessed image frames may result in a reduced perceptual quality from the original unprocessed image frame.

The original raw data from an image sensor may be referred to as an unprocessed image frame. Image enhancement such as multi-frame unprocessed image frame de-noising and/or high dynamic range (HDR) fusion, are typically concurrently processed for multiple unprocessed image frames. Each unprocessed image frame may be accessed multiple times depending on processing. Frequent reads and/or writes of the stored unprocessed image frame may become an image processing bottleneck, since the unprocessed image frames may be transferred and stored in slower off-chip memory due to capacity limitations of on-chip memory. High throughput of frequent write/read access leads to a high data bandwidth. As a result, unprocessed image frames necessitate compression for processing efficiency. The proposed solution may reduce the storage size of the unprocessed image frames while maintaining the perceptual fidelity of the frames. The maintenance of perceptual fidelity of the image frames lead to encoding-decoding that maintains high perceptual value image details for subsequent processing.

The number orbits per pixel (BPP) is often used to describe the number of bits needed to represent a single pixel in an image. A typical unprocessed image frame has BPP of more than 8, such as, 10, 12, 14 BPP and the like. The current technique of representing each pixel with the same number of bits is suboptimal in terms of storage efficiency due to data redundancy.

Figure 3:
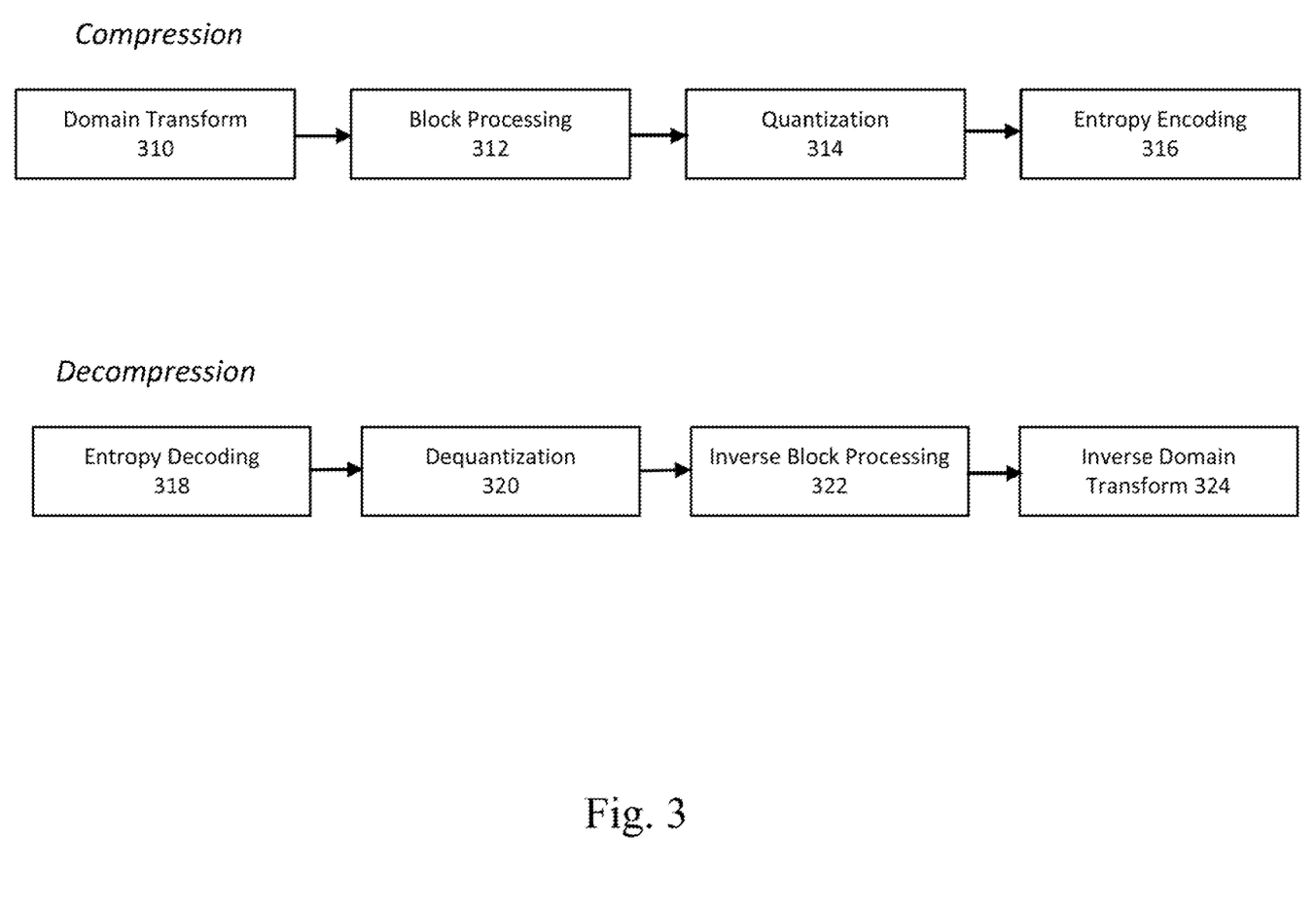
FIG. 3 is an example flow in accordance with one embodiment of the disclosure.

FIG. 3 depicts an example compression method that may include a domain transform 310, block processing 312, quantization 314, and entropy coding 316. Likewise, an example decompression method may include entropy decoding 318, dequantization 320, inverse block processing 322, and inverse domain transform 324.

An example domain transform receives an unprocessed image frame having a frame with a size of height h and a width w that may be sampled in a Bayer color filter array format such as RGGB or other modified Bayer format such as quad Bayer and the like. The sampled color filter array format has spectral correlation across different color/spectral channels. Therefore, the inter-channel redundancy may be utilized to boost compression performance by transforming the original unprocessed image frame according to a color/spectral decorrelation.

One example of the many invertible transforms may be defined as follows:

$Y=(R+G1+G2+B)/4,$ $C1=(2B-G1-G2)/4,$ $C2=(2R-G1-G2)/4,$ $H=(G1-G2)/2,$ where R, G1, G2, and B are respectively red, first green, second green, and blue pixels within a 2×2 color filter array pattern. Y is termed the luminance channel, C1 and C2 represent a blue-green and a red-green difference, and H represents the green difference. The transformed frame has the dimension of h/2×w/2×4 and its histogram distribution allow for increased compression.

The corresponding inverse transform is defined as follows:

$R=(2Y+3C2-C1)/2,$ $G1=(2Y-C1-C2+2H)/2,$ $G2=(2Y-C1-C2-2H)/2,$ $B=(2Y+3C1-C2)/2.$

The original unprocessed image frame may be recovered by applying inverse domain transformations. The forward and inverse transformations may be lossless in that they do not change or approximate the original unprocessed image frame. Lossless compression allows the original data to be reconstructed in its original form from the compressed data.

Block processing facilitates the concurrent processing of multiple unprocessed image frames and constrains the memory footprint for processing. A single unprocessed image frame may be divided into regular blocks. These blocks may have variable sizes and shapes, e.g., 8×8, 8×16, etc. The image data within a block may be transformed utilizing coefficients that are compression friendly. For example, using DCT (discrete cosine transform) or wavelet transformations may allow separation of low-frequency image content from high-frequency image content. Transformed coefficients may be reorganized or retransformed based on compression needs.

The original unprocessed image frame may be reconstructed by applying a corresponding inverse transform, e.g., inverse DCT or inverse wavelet transform. Forward and inverse transforms may be lossless steps which do not change or approximate original image dataset.

Quantization may reduce the unprocessed image frame size. Transformed coefficients may be quantized according to a pre-defined or adaptive quantization table. One example table preferentially quantizes insignificant coefficients while reducing or avoiding quantization of critical coefficients based on image quality standards. For example, data redundancy may be reduced by applying large quantization factors on higher-frequency coefficients that represent less noticeable image details while retaining lower-frequency coefficients that represent perceptually important image details so that these details can be reconstructed to help image enhancement.

Quantized coefficients may be reconstructed by applying dequantization utilizing the same quantization table. Quantization may be lossy, and the original coefficients may be approximately recovered. The accuracy loss may be reduced by the selection of the quantization table. Additional quantization leads to image accuracy loss and image degradation.

Entropy coding may further reduce the size of an unprocessed image frame, its quantized coefficients may be coded with various entropy encoders, such as Huffman or Arithmetic coding. The size of an unprocessed image frame may be reduced while the frame is effectively encoded in a bit-wise format. The encoded bit data may be transferred and stored on low-speed off-chip memory that may be accessed later for multi-frame processing. Since the size of the encoded bits is often of a fraction of the original unprocessed image frame size, both transfer bandwidth and memory buffer may be saved. Unprocessed image frame compression also makes simultaneously processing of more than just a few unprocessed image frames possible.

Encoded bit data may be accessed and decoded with the same entropy encoder for multiple unprocessed image frame processing. Entropy encoding and decoding may be lossless compression steps, which do not change or approximate original data.

The lossy unprocessed image frame compression may be modified to accommodate lossless compression. Block processing and quantization may be replaced with predictive coding that utilizes local similarity within a pre-defined neighborhood around the pixel of interest. In one example an intra-channel difference between a target pixel and the pixel before may be determined and then encoded using an entropy coder optimized for that difference.

The proposed image compression method may accommodate unprocessed video frame compression. The video frames of an unprocessed image frame may be treated as individual frames and the compression method may be similarly applied. The method allows for video compression and video decompression.

Figure 4:
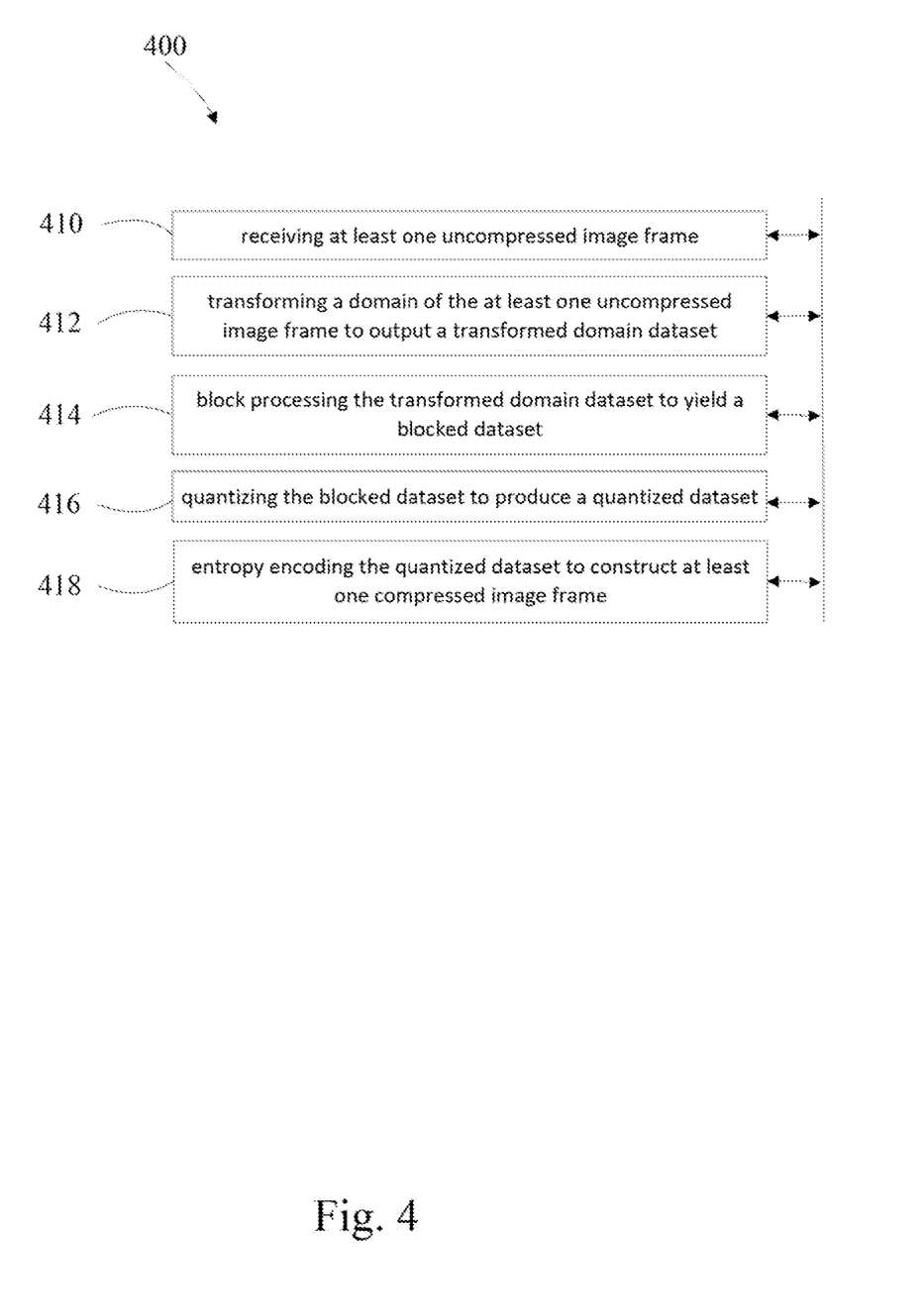
FIG. 4 is an example of a method of unprocessed image frame compression in accordance with one embodiment of the disclosure.

FIG. 4 depicts an example method of image compression, including, receiving 410 at least one unprocessed image frame, transforming 412 a domain of the at least one unprocessed image frame to output a transformed domain dataset and block processing 414 the transformed domain dataset to yield a blocked dataset. The method also includes quantizing 416 the blocked dataset to produce a quantized dataset and entropy encoding 418 the quantized dataset to construct at least one compressed image frame.

The method may further include reorganizing and or retransforming a set of transform coefficients of the block processing. The transforming may include a luminance, a blue-green difference, a red-green difference and a first green to second green difference. The block processing may divide the transformed domain dataset into a set of regular blocks. The block processing may utilize at least one of discrete cosine transform and wavelet transform. A quantization factor may be applied for quantization may be based on a set of coefficient frequencies and or a coefficient criticality. The entropy encoding may be processed by at least one of Huffman coding and Arithmetic coding.

Figure 5:
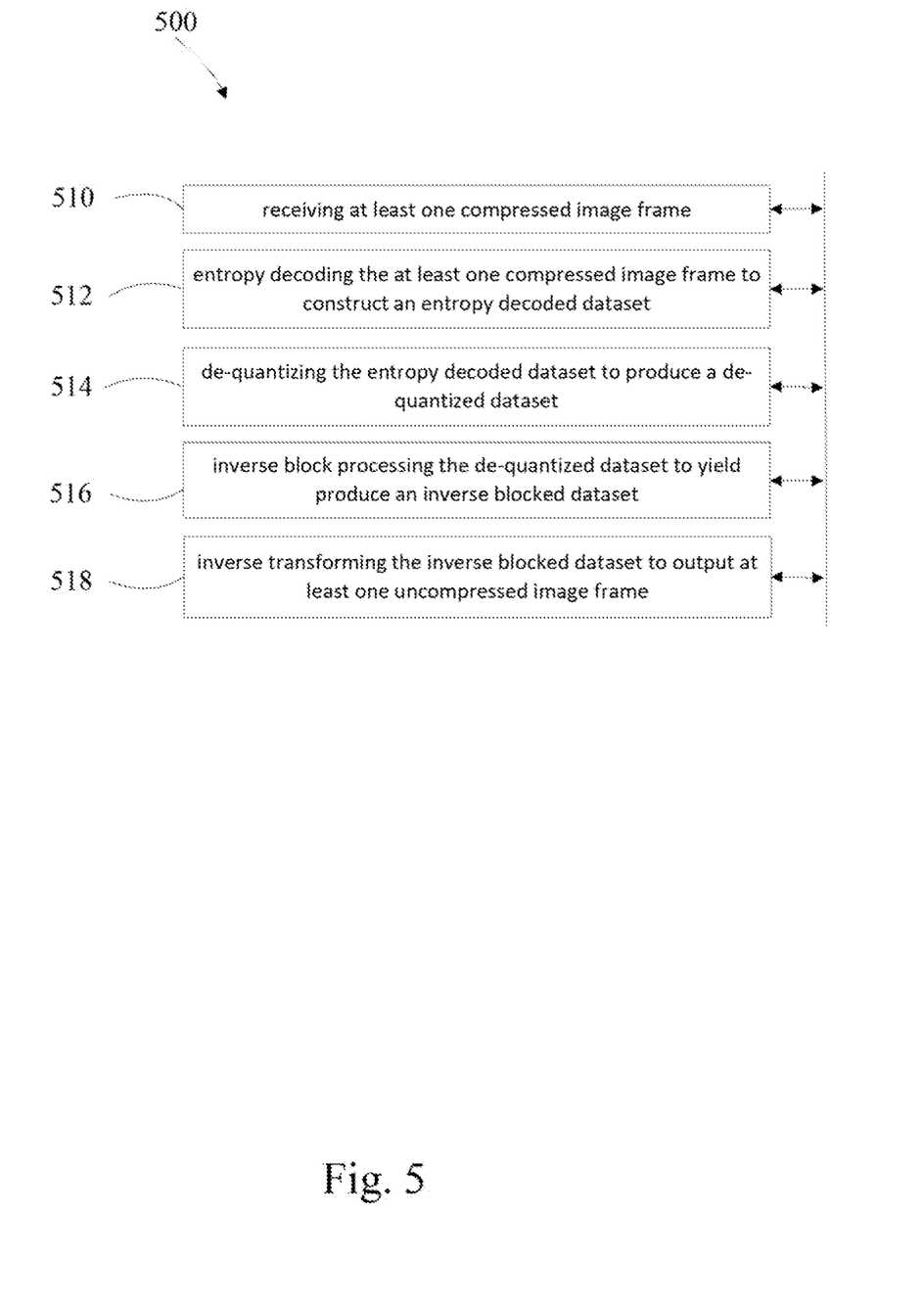
FIG. 5 is an example of an example method of image frame decompression in accordance with one embodiment of the disclosure.

FIG. 5 depicts an example method of image decompression, including, receiving 510 at least one compressed image frame, entropy decoding 512 the at least one compressed image frame to construct an entropy decoded dataset and de-quantizing 514 the entropy decoded dataset to produce a de-quantized dataset. The method also includes inverse block processing 516 the de-quantized dataset to yield produce an inverse blocked dataset and inverse transforming 518 the inverse blocked dataset to output at least one unprocessed image frame.

The method may further include retransforming and or reorganizing a set of inverse transform coefficients of the inverse block processing. The entropy decoding may be processed by at least one of Huffman decoding and Arithmetic decoding. A de-quantization factor applied to de-quantization may be based on a coefficient criticality and or on a set of coefficient frequencies. The inverse block processing may perform reassembly of the de-quantized dataset into a set of regular blocks. The inverse transformation may include a luminance, a blue-green difference, a red-green difference and a first green to second green difference. The decompressed image dataset may include at least three color channels.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of image compression, comprising:
receiving at least one unprocessed image frame, wherein the unprocessed image frame is at least one of unprocessed and minimally processed;
transforming a domain of the at least one unprocessed image frame to output a transformed domain dataset wherein the unprocessed image frame is sampled in a Bayer color filter array format and the transformed domain dataset is in a domain having a luminance channel, a blue-green difference channel, a red-green difference channel, and a first green to second green difference channel:
block processing the transformed domain dataset to yield a blocked dataset, wherein the block processing utilizes at least one of discrete cosine transform and wavelet transform;
quantizing the blocked dataset to produce a quantized dataset; and
entropy encoding the quantized dataset to construct at least one compressed image frame.

2. The method of image compression of claim 1, wherein the block processing divides the transformed domain dataset into a set of regular blocks.

3. The method of image compression of claim 1, further comprising reorganizing a set of transform coefficients of the block processing.

4. The method of image compression of claim 1, further comprising retransforming a set of transform coefficients of the block processing.

5. The method of image compression of claim 1, wherein a quantization factor applied for quantization is based on a set of coefficient frequencies.

6. The method of image compression of claim 1, wherein a quantization factor applied for quantization is based on a coefficient criticality.

7. The method of image compression of claim 1, wherein the entropy encoding is processed by at least one of Huffman coding and Arithmetic coding.

8. The method of image compression of claim 1, wherein the transforming of the at least one unprocessed image frame is a lossless transformation.

9. The method of image compression of claim 1, wherein the at least one unprocessed image frame is a video frame.

10. A method of image decompression, comprising:
receiving at least one compressed image frame;
entropy decoding the at least one compressed image frame to construct an entropy decoded dataset;
de-quantizing the entropy decoded dataset to produce a de-quantized dataset;
inverse block processing the de-quantized dataset to yield produce an inverse blocked dataset, wherein the inverse block processing utilizes at least one of inverse discrete cosine transform and inverse wavelet transform; and
inverse transforming the inverse blocked dataset to output at least one unprocessed image frame, wherein the uncompressed image frame is in a Bayer color filter array format and the inverse blocked dataset is in a domain having a luminance channel, a blue-green difference channel, a red-green difference channel, and a first green to second green difference channel.

11. The method of image decompression of claim 10, wherein the entropy decoding is processed by at least one of Huffman decoding and Arithmetic decoding.

12. The method of image decompression of claim 10, wherein a de-quantization factor applied to de-quantization based on a coefficient criticality.

13. The method of image decompression of claim 10, wherein a de-quantization factor applied to de-quantization based on a set of coefficient frequencies.

14. The method of image decompression of claim 10, further comprising retransforming a set of inverse transform coefficients of the inverse block processing.

15. The method of image decompression of claim 10, further comprising reorganizing a set of inverse transform coefficients of the inverse block processing.

16. The method of image decompression of claim 10, wherein the inverse transformation includes at least three color channels.

17. The method of image decompression of claim 10, wherein the inverse transforming of the at least one compressed image frame is a lossless inverse transformation.

18. The method of image decompression of claim 10, wherein the at least one compressed image frame is a video frame.

\* \* \* \* \*